(12) United States Patent
Yang et al.

(10) Patent No.: US 10,429,841 B2
(45) Date of Patent: Oct. 1, 2019

(54) VEHICLE CONTROL METHOD AND APPARATUS AND METHOD AND APPARATUS FOR ACQUIRING DECISION-MAKING MODEL

(71) Applicant: BAIDU ONLINE NETWORK TECHNOLOGY (BEIJING) CO., LTD., Beijing (CN)

(72) Inventors: Wenli Yang, Beijing (CN); Tianlei Zhang, Beijing (CN); Yuchang Pan, Beijing (CN); Haowen Sun, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 28 days.

(21) Appl. No.: 15/273,528

(22) Filed: Sep. 22, 2016

(65) Prior Publication Data

US 2017/0357257 A1    Dec. 14, 2017

(30) Foreign Application Priority Data

Jun. 12, 2016    (CN) .......................... 2016 1 0407031

(51) Int. Cl.
*G05D 1/00*    (2006.01)
*G05B 17/02*    (2006.01)
(Continued)

(52) U.S. Cl.
CPC ......... *G05D 1/0088* (2013.01); *G05B 13/027* (2013.01); *G05B 17/02* (2013.01);
(Continued)

(58) Field of Classification Search
CPC .... G05D 1/0088; G05D 1/0274; G05B 17/02; G05B 13/027; G06N 3/08; G06N 99/005; G06N 20/00
See application file for complete search history.

(56) References Cited

U.S. PATENT DOCUMENTS 6,256,560 B1 * 7/2001 Kim .................. G05D 1/0246
180/168
6,493,614 B1 * 12/2002 Jung .................. G05D 1/0246
180/168
(Continued)

FOREIGN PATENT DOCUMENTS

CN    104238557 A    12/2014
CN    104943684 A    9/2015
(Continued)

OTHER PUBLICATIONS

From CN Application No. 201610407031.8, Search Report dated Feb. 15, 2017.
(Continued)

*Primary Examiner* — Courtney D Heinle
(74) *Attorney, Agent, or Firm* — Ladas & Parry, LLP

(57) ABSTRACT

The present invention discloses a vehicle control method and apparatus and a method and apparatus for acquiring a decision-making model. The vehicle control method, comprising: during travel of an unmanned vehicle, acquiring current external environment information and map information in real time; determining vehicle state information corresponding to the external environment information and map information acquired each time according to a decision-making model obtained by pre-training and reflecting correspondence relationship between the external environment information, map information and vehicle state information, and controlling a travel state of the unmanned vehicle according to the determined vehicle state information.

(Continued)

Application of the solution of the present invention can improve security and reduce the workload.

7 Claims, 2 Drawing Sheets

(51) Int. Cl.
  *G05D 1/02* (2006.01)
  *G06N 3/08* (2006.01)
  *G06N 20/00* (2019.01)
  *G05B 13/02* (2006.01)
(52) U.S. Cl.
  CPC ............. *G05D 1/0274* (2013.01); *G06N 3/08* (2013.01); *G06N 20/00* (2019.01)

(56) References Cited

U.S. PATENT DOCUMENTS

| | | | | |
|---|---|---|---|---|
| 2014/0371973 | A1* | 12/2014 | Pfaff | G05D 1/0088 |
| | | | | 701/23 |
| 2015/0006005 | A1* | 1/2015 | Yu | G06Q 10/08 |
| | | | | 701/22 |
| 2015/0211868 | A1* | 7/2015 | Matsushita | G01C 21/32 |
| | | | | 701/457 |
| 2017/0016734 | A1* | 1/2017 | Gupta | G01C 21/3697 |
| 2017/0166222 | A1* | 6/2017 | James | B60W 50/14 |
| 2017/0193338 | A1* | 7/2017 | Huberman | G05D 1/0088 |
| 2017/0206426 | A1* | 7/2017 | Schrier | G05D 1/0088 |
| 2017/0248955 | A1* | 8/2017 | Banvait | G05D 1/0088 |
| 2017/0300762 | A1* | 10/2017 | Ishii | B60R 1/00 |
| 2017/0305434 | A1* | 10/2017 | Ratnasingam | B60W 40/09 |
| 2018/0032082 | A1* | 2/2018 | Shalev-Shwartz | |
| | | | | G05D 1/0221 |

FOREIGN PATENT DOCUMENTS

| | | |
|---|---|---|
| CN | 105151043 A | 12/2015 |
| JP | H07-225894 A | 8/1995 |
| JP | H07-306717 A | 11/1995 |
| JP | 2005-100421 A | 4/2005 |
| JP | 2016-024598 A | 2/2016 |
| WO | 2014/013985 A1 | 6/2016 |

OTHER PUBLICATIONS

From CN Application No. 201610407031.8, Office Action dated Feb. 23, 2017 with English translation from Global Dossier.
From CN Application No. 201610407031.8, Office Action dated Jun. 15, 2017 with English translation from Global Dossier.
From CN Application No. 201610407031.8, Office Action dated Aug. 8, 2017 with English translation from Global Dossier.
From CN Application No. 201610407031.8, Office Action dated Oct. 9, 2017 with English translation from Global Dossier.
From JP Application No. 2016-190244, Office Action dated Sep. 5, 2017 with English translation from Global Dossier.
From CN Application No. 201610407031.8, Third Office Action, dated Aug. 8, 2017, with English translation from Global Dossier.
From CN Application No. 201610407031.8, Fourth Office Action, dated Oct. 9, 2017, with English translation from Global Dossier.

* cited by examiner

VEHICLE CONTROL METHOD AND APPARATUS AND METHOD AND APPARATUS FOR ACQUIRING DECISION-MAKING MODEL

CROSS-REFERENCE TO RELATED APPLICATION

This application claims the priority to and the benefit of Chinese Patent Application No. CN201610407031.8 filed on Jun. 12, 2016, the disclosure of which is incorporated herein by reference in its entirety.

FIELD OF THE INVENTION

The present invention relates to unmanned driving technologies, and particularly to a method and apparatus for controlling an unmanned vehicle and a method and apparatus for acquiring a decision-making model.

BACKGROUND OF THE INVENTION

During the travel of an unmanned vehicle, a decision needs to be made in real time according to acquired geographic information and external environment information. The decision includes braking, acceleration, lane change, turn, U-turn, and reversing and the like, and a travel state of the unmanned vehicle is controlled according to the decision-making result.

In the prior art, decision-making may be performed based on some manually pre-edited rules. However, manually-edited rules usually cannot cover all road conditions, and there will be a large hidden safety risk on unknown road conditions which do not have corresponding rules. Furthermore, excessive manually-edited rules increase the editing and maintenance workload.

SUMMARY OF THE INVENTION

The present invention provides a vehicle control method and apparatus and a method and apparatus for acquiring a decision-making model, which can improve security and reduce the workload.

Specific technical solutions are as follows:

A vehicle control method, comprising:

during travel of an unmanned vehicle, acquiring current external environment information and map information in real time;

determining vehicle state information corresponding to the external environment information and map information acquired each time according to a decision-making model obtained by pre-training and reflecting correspondence relationship between the external environment information, map information and vehicle state information, and controlling a travel state of the unmanned vehicle according to the determined vehicle state information.

According to a preferred embodiment of the present invention, the determining the vehicle state information corresponding to the external environment information and map information acquired each time comprises:

Integrating the external environment information and map information acquired each time as input of the decision-making model, and obtaining the vehicle state information output by the decision-making model.

According to a preferred embodiment of the present invention, the map information is map information acquired based on a high-precision map;

a type of the decision-making model comprises: Support Vector Machine (SVM) model and neural network model.

A method for acquiring a decision-making model comprises:

acquiring current external environment information, map information and vehicle state information in real time when a driver drives a vehicle on a road;

obtaining a decision-making model reflecting correspondence relationship between the external environment information, map information and vehicle state information by training according to the acquired information after completion of information acquisition, so as to, during the travel of the unmanned vehicle, after the current external environment information and map information are acquired each time, determine the vehicle state information corresponding to the acquired external environment information and map information according to the decision-making model, and control the travel state of the unmanned vehicle according to the determined vehicle state information.

According to a preferred embodiment of the present invention, the obtaining the decision-making model by training comprises:

using the external environment information, map information and vehicle state information acquired each time to form a training sample, and integrating the external environment information and map information in each training sample as input of the training sample, and taking the vehicle state information in each training sample as output in the training sample;

obtaining the decision-making model by training according to input and output in the training samples.

According to a preferred embodiment of the present invention, the method further comprises:

screening out training samples containing abnormal data from all training samples, and obtaining the decision-making model by training according to the remaining training samples.

According to a preferred embodiment of the present invention, the map information is map information acquired based on a high-precision map;

a type of the decision-making model comprises: Support Vector Machine (SVM) model and neural network model.

A vehicle control apparatus comprises: an acquiring unit, a decision-making unit and a control unit;

the acquiring unit is configured to, during travel of an unmanned vehicle, acquire current external environment information and map information in real time, and transmit the external environment information and map information acquired each time to the decision-making unit;

the decision-making unit is configured to determine vehicle state information corresponding to the external environment information and map information received each time according to a decision-making model obtained by pre-training and reflecting correspondence relationship between the external environment information, map information and vehicle state information, and transmit the determined vehicle state information to the control unit;

the control unit is configured to control a travel state of the unmanned vehicle according to the received vehicle state information.

According to a preferred embodiment of the present invention, the decision-making unit integrates the external environment information and map information received each time as input of the decision-making model, and thereby obtains the vehicle state information output by the decision-making model.

According to a preferred embodiment of the present invention, the map information is map information acquired based on a high-precision map;

a type of the decision-making model comprises: Support Vector Machine (SVM) model and neural network model.

An apparatus for acquiring a decision-making model comprises: a data collecting unit and a model training unit.

the data collecting unit is configured to acquire current external environment information, map information and vehicle state information in real time when a driver drives a vehicle on a road;

the model training unit is configured to obtain a decision-making model reflecting correspondence relationship between the external environment information, map information and vehicle state information by training according to the acquired information after completion of data collection, so as to, during the travel of the unmanned vehicle, after the current external environment information and map information are acquired each time, determine the vehicle state information corresponding to the acquired external environment information and map information according to the decision-making model, and thereby control the travel state of the unmanned vehicle according to the determined vehicle state information.

According to a preferred embodiment of the present invention, the model training unit uses the external environment information, map information and vehicle state information acquired each time to form a training sample, and integrates the external environment information and map information in each training sample as input of the training sample, takes the vehicle state information in each training sample as output in the training sample, and obtains the decision-making model according to input and output in the training samples.

According to a preferred embodiment of the present invention, the model training unit is further configured to screen out training samples containing abnormal data from all training samples, and obtain the decision-making model by training according to the remaining training samples.

According to a preferred embodiment of the present invention, the map information is map information acquired based on a high-precision map;

a type of the decision-making model comprises: Support Vector Machine (SVM) model and neural network model.

As can be seen from the above depictions, with the solution of the present invention being used, during the travel of the unmanned vehicle, the current external environment information and map information may be acquired in real time; vehicle state information corresponding to external environment information and map information acquired each time is determined according to a decision-making model obtained by pre-training and reflecting correspondence relationship between the external environment information, map information and vehicle state information, and thereby a travel state of the unmanned vehicle is controlled according to the determined vehicle state information. As compared with the prior art, the solution of the present invention is adapted for any road condition, improves a decision-making capability for the unknown road conditions, and thereby improves security. Furthermore, since the rule editing needn't be performed manually, the workload for editing and maintenance rules is reduced.

DETAILED DESCRIPTION OF PREFERRED EMBODIMENTS

The solutions of the present invention will be described in detail in conjunction with figures and embodiments to make technical solutions of the present invention clearer.

Embodiment 1

Figure 1:
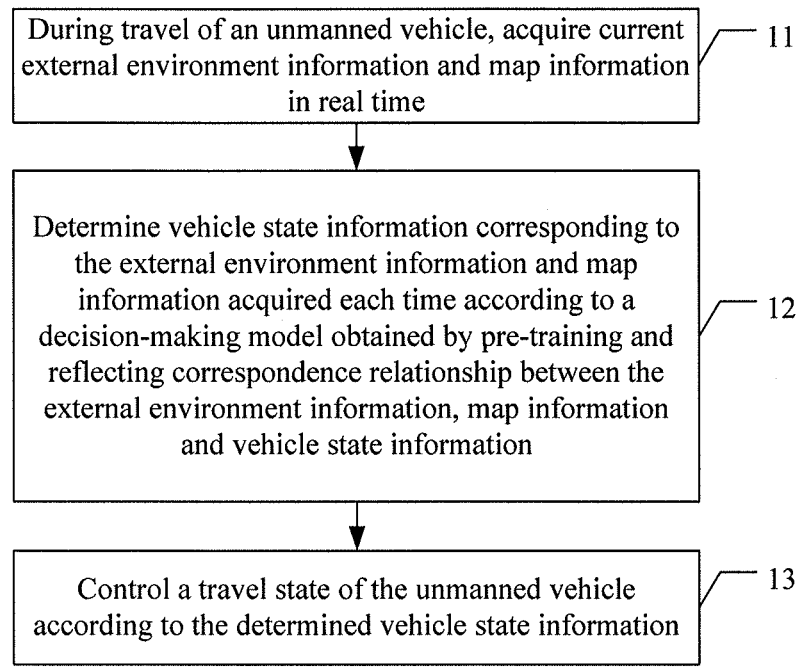
FIG. 1 is a flow chart of an embodiment of a vehicle control method according to the present invention.

FIG. 1 is a flow chart of an embodiment of a vehicle control method according to the present invention. As shown in FIG. 1, the embodiment comprises the following specific implementation mode.

In step 11, during travel of the unmanned vehicle, current external environment information and map information are acquired in real time.

During travel of the unmanned vehicle, current external environment information and map information may be acquired in real time. "Acquired in real time" as mentioned here does not refer to continuous acquisition in an absolute sense but refers to periodical acquisition within a very small periodical duration such as 0.5 seconds.

The external environment information may also be called perceptual information. The environment information around the unmanned vehicle may be acquired in real time by a laser radar, millimeter wave radar and a camera, and may comprise location, size, speed and direction of surrounding vehicles; location, speed, direction and the like of surrounding pedestrians.

Wherein the location of a surrounding vehicle usually refers to a location of the surrounding vehicle relative to the unmanned vehicle, and likewise, the location of a surrounding pedestrian refers to a location of the surrounding pedestrian relative to the unmanned vehicle.

The acquired map information is map information acquired based on a high-precision map.

A conventional ordinary map only contains simple road path information, whereas a high-precision map specifies information such as a precise location of each lane line, lane curvature, lane speed limit, and lane connection attribute. That is to say, as compared with an ordinary map, the high-precision map contains richer and more detailed information content and meanwhile has a smaller error.

The acquired map information in the present embodiment refers to map data around the unmanned vehicle obtained according to the high-precision map, and may comprise vehicle coordinates, and whether there are a crossing, a flyover, traffic lights and stop lines ahead of the vehicle.

Wherein the vehicle coordinates usually refer to distances between the unmanned vehicle and lane lines on both sides of the lane; judging whether there is a crossing ahead of the vehicle usually refers to judging whether there is a crossing within a predetermined distance such as 200 meters ahead of the unmanned vehicle.

In step 12, vehicle state information corresponding to external environment information and map information acquired each time is determined according to a decision-making model obtained by pre-training and reflecting correspondence relationship between the external environment information, map information and vehicle state information.

The external environment information and map information acquired each time may be integrated as input of the decision-making model obtained by pre-training, thereby obtaining the vehicle state information output by the decision-making model.

The vehicle state information may comprise: vehicle speed, acceleration, steering wheel angle, angular speed of the steering wheel, a state of a steering indicator light, a state of a high-beam light, a state of a dipped headlight and the like.

The state of the steering indicator light means whether the steering indicator light is turned on, and the steering indicator light on which side is turned on; the state of the high-beam light means whether the high-beam light is turned on; the state of the dipped headlight means whether the dipped headlight is turned on.

In step 13, a travel state of the unmanned vehicle is controlled according to the determined vehicle state information.

The travel state of the unmanned vehicle may be controlled according to the determined vehicle state information as well as the prior art.

The content in Embodiment 1 may be listed as follows:

Assume that a current moment is moment a, and that there are external environment information a and map information a when the moment a is obtained, vehicle state information a corresponding to the external environment information a and map information a is determined according to the decision-making model, and thereby the travel state of the unmanned vehicle is controlled according to the vehicle state information a;

Assume that next moment is moment b, and that there are external environment information b and map information b when the moment b is obtained, vehicle state information b corresponding to the external environment information b and map information b is determined according to the decision-making model, and thereby the travel state of the unmanned vehicle is controlled according to the vehicle state information b;

And so on;

An interval between moment a and moment b may be a very short time duration to achieve real-time control.

How to the aforesaid decision-making model is described below in detail through Embodiment 2.

Embodiment 2

Figure 2:
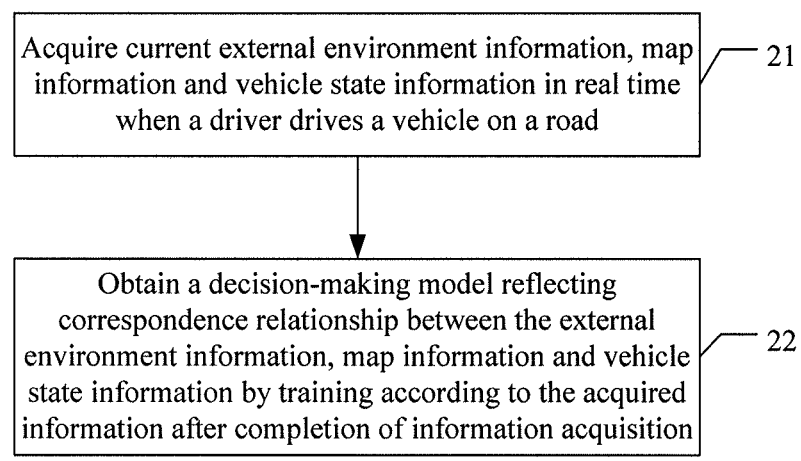
FIG. 2 is a flow chart of an embodiment of a method of acquiring a decision-making model according to the present invention.

FIG. 2 is a flow chart of an embodiment of a method of acquiring a decision-making model according to the present invention. As shown in FIG. 2, the method comprises the following specific implementation modes:

In step 21, current external environment information, map information and vehicle state information are acquired in real time when a driver drives a vehicle on a road.

An experienced driver with excellent driving expertise may be allowed to drive the vehicle on the road. During the travel of the vehicle, current external environment information, map information and vehicle state information are acquired (gathered and collected) in real time.

Information may be collected in the above manner by only using one vehicle, or the information may be collected in the above manner using a plurality of vehicles at the same time or at different time.

Wherein the acquired external environment information may comprise location, size, speed and direction of surrounding vehicles; location, speed, direction and the like of surrounding pedestrians.

The acquired map information is map information acquired based on a high-precision map, and may comprise: vehicle coordinates, and whether there are a crossing, a flyover, traffic lights and stop lines and the like ahead of the vehicle.

The acquired vehicle state information may comprise: vehicle speed, acceleration, steering wheel angle, angular speed of the steering wheel, a state of a steering indicator light, a state of a high-beam light, a state of a dipped headlight and the like.

In step 22, a decision-making model reflecting correspondence relationship between the external environment information, map information and vehicle state information is obtained by training according to the acquired information upon completion acquisition of the information.

The training of the decision-making model may be performed after sufficient external environment information, map information and vehicle state information is collected.

For example, the external environment information, map information and vehicle state information acquired each time may be allowed to form a training sample, and the external environment information and map information in each training sample is integrated as input of the training sample, the vehicle state information in each training sample is taken as output in the training sample, and the decision-making model is obtained according to input and output in the training samples.

That is, the external environment information, map information and vehicle state information that are acquired at the same moment and correspond to one another are used to form a training sample.

Integrating the external environment information and map information means subjecting the two parts of information to merge processing. The information resulting from the integration is taken as the input, and the corresponding vehicle state information is taken as the output to train the decision-making model.

In addition, training samples containing abnormal data may be screened out from all training samples, and the decision-making model is obtained by training according to the remaining training samples.

For example, according to experience, a speed of a surrounding pedestrian is not larger than threshold A. If the speed of the surrounding pedestrian in a certain training sample exceeds threshold A, it may be believed that the acquisition of the information is erroneous, and correspondingly, the training sample is screened out.

The decision-making model is obtained by training according to the remaining training samples after the screening. A type of the decision-making model may comprise: Support Vector Machine (SVM) model, neural network model, or the like.

How to obtain the decision-making model by training is of the prior art. For example, a designated feature may be selected on the basis of the input and output in the training sample, simulated training is performed according to the selected designated feature, and the selected feature may be optimized constantly during training iteration.

The decision-making model obtained by training may be provided for use by the unmanned vehicle; during the travel of the unmanned vehicle, the current external environment information and map information are acquired in real time. After the external environment information and map information are acquired each time, the vehicle state information corresponding to the acquired external environment information and map information may be determined according to the decision-making model, and thereby the travel state of the unmanned vehicle may be controlled according to the determined vehicle state information.

The method embodiments of the present invention are described above. Apparatus embodiments of the present invention are introduced through Embodiment 3 and Embodiment 4.

Embodiment 3

Figure 3:
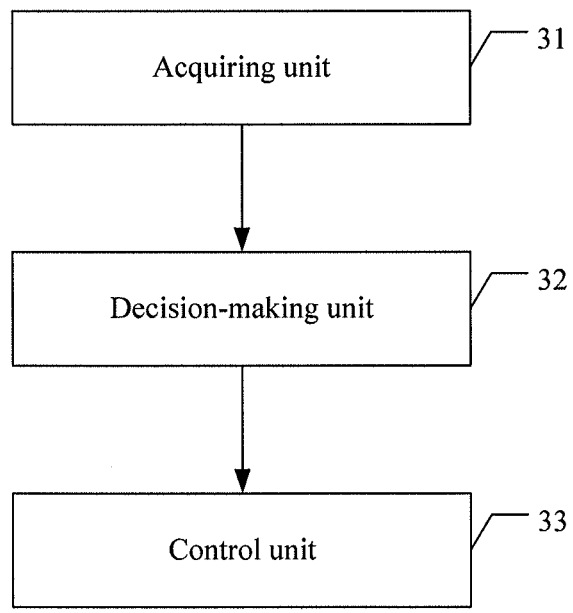
FIG. 3 is a structural schematic view of components of an embodiment of a vehicle control apparatus according to the present invention.

FIG. 3 is a structural schematic view of components of an embodiment of a vehicle control apparatus according to the present invention. As shown in FIG. 3, the apparatus comprises an acquiring unit 31, a decision-making unit 32 and a control unit 33.

The acquiring unit 31 is configured to, during travel of an unmanned vehicle, acquire current external environment information and map information in real time, and transmit the external environment information and map information acquired each time to the decision-making unit 32;

The decision-making unit 32 is configured to determine vehicle state information corresponding to the external environment information and map information received each time according to a decision-making model obtained by pre-training and reflecting correspondence relationship between the external environment information, map information and vehicle state information, and transmit the determined vehicle state information to the control unit 33;

The control unit 33 is configured to control a travel state of the unmanned vehicle according to the received vehicle state information.

During the travel of the unmanned vehicle, the acquiring unit 31 may acquire current external environment information and map information in real time, and transmit the external environment information and map information acquired each time to the decision-making unit 32 so that the decision-making unit 32 makes a decision.

The acquired external environment information may comprise location, size, speed and direction of surrounding vehicles; location, speed, direction and the like of surrounding pedestrians.

The acquired map information is map information acquired based on a high-precision map, and may comprise: vehicle coordinates, and whether there are a crossing, a flyover, traffic lights and stop lines and the like ahead of the vehicle.

The decision-making unit 32 may integrate the external environment information and map information received each time as input of the decision-making model obtained by pre-training, and thereby obtain the vehicle state information output by the decision-making model. A type of the decision-making model may comprise: Support Vector Machine (SVM) model, neural network model, or the like.

The vehicle state information may comprise: vehicle speed, acceleration, steering wheel angle, angular speed of the steering wheel, a state of a steering indicator light, a state of a high-beam light, a state of a dipped headlight and the like.

The decision-making unit 32 may transmit the determined vehicle state information to the control unit 33, and correspondingly, the control unit 33 may control the travel state of the unmanned vehicle according to the received vehicle state information as well as the prior art.

Embodiment 4

Figure 4:
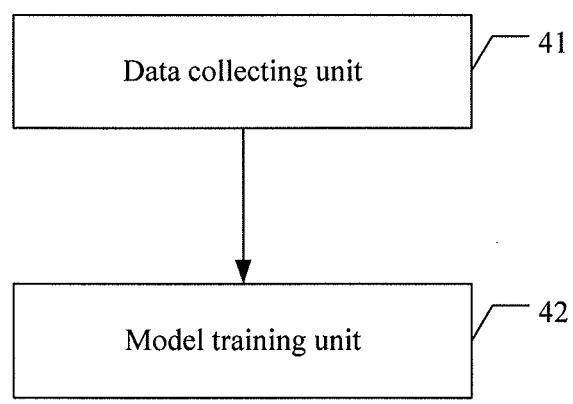
FIG. 4 is a structural schematic view of components of an embodiment of an apparatus for acquiring a decision-making model according to the present invention.

FIG. 4 is a structural schematic view of components of an embodiment of an apparatus for acquiring a decision-making model according to the present invention. As shown in FIG. 4, the apparatus comprises: a data collecting unit 41 and a model training unit 42.

The data collecting unit 41 is configured to acquire current external environment information, map information and vehicle state information in real time when a driver drives a vehicle on a road.

The model training unit 42 is configured to obtain a decision-making model reflecting correspondence relationship between the external environment information, map information and vehicle state information by training according to the acquired information after completion of data collection, so as to, during the travel of the unmanned vehicle, after the current external environment information and map information are acquired each time, determine the vehicle state information corresponding to the acquired external environment information and map information according to the decision-making model, and thereby control the travel state of the unmanned vehicle according to the determined vehicle state information.

An experienced driver with excellent driving expertise may be allowed to drive the vehicle on the road. During the travel of the vehicle, the data collecting unit 41 may acquire current external environment information, map information and vehicle state information in real time.

Information may be collected in the above manner by only using one vehicle, or the information may be collected in the above manner using a plurality of vehicles at the same time or at different time.

The acquired external environment information may comprise location, size, speed and direction of surrounding vehicles; location, speed, direction and the like of surrounding pedestrians.

The acquired map information is map information acquired based on a high-precision map, and may comprise: vehicle coordinates, and whether there are a crossing, a flyover, traffic lights and stop lines and the like ahead of the vehicle.

The acquired vehicle state information may comprise: vehicle speed, acceleration, steering wheel angle, angular speed of the steering wheel, a state of a steering indicator light, a state of a high-beam light, a state of a dipped headlight and the like.

The model training unit 42 performs the training of the decision-making model after sufficient external environment information, map information and vehicle state information is collected.

For example, the model training unit 42 may use the external environment information, map information and vehicle state information acquired each time to form a training sample, and integrate the external environment information and map information in each training sample as input of the training sample, take the vehicle state information in each training sample as output in the training sample, and obtain the decision-making model by training according to input and output in the training samples.

In addition, the model training unit 42 may further screen out training samples containing abnormal data from all training samples, and obtain the decision-making model by training according to the remaining training samples. For example, according to experience, a speed of a surrounding pedestrian is not larger than threshold A. However, if the speed of the surrounding pedestrian in a certain training sample exceeds threshold A, it may be believed that the acquisition of the information is erroneous, and correspondingly, the training sample is screened out.

The model training unit 42 obtains the decision-making model by training according to the remaining training samples after the screening. A type of the decision-making model may comprise: Support Vector Machine (SVM) model, neural network model, or the like.

How to obtain the decision-making model by training is of the prior art. For example, a designated feature may be selected on the basis of the input and output in the training sample, simulated training is performed according to the selected designated feature, and the selected feature may be optimized constantly during training iteration.

The model training unit 42 may provide the decision-making model obtained by training for use by the unmanned vehicle; during the travel of the unmanned vehicle, acquire the current external environment information and map information in real time; after the external environment information and map information are acquired each time, determine the vehicle state information corresponding to the acquired external environment information and map information according to the decision-making model, and thereby control the travel state of the unmanned vehicle according to the determined vehicle state information.

As known from depictions in the above embodiments, the solution of the present invention is adapted for any road condition and thereby improve security. Furthermore, since the rule editing needn't be performed manually, the workload for editing and maintenance rules is reduced. In addition, the solution of the present invention is simple and convenient to implement so that it can be easily spread and popularized.

In the embodiments provided by the present invention, it should be understood that the revealed apparatus and method can be implemented through other ways. For example, the embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present invention, functional units can be integrated in one processing unit, or they can be separate physical presences; or two or more units can be integrated in one unit. The integrated unit described above can be realized in the form of hardware, or they can be realized with hardware and software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present invention. The aforementioned storage medium includes various media that may store program codes, such as U disk, removable hard disk, read-only memory (ROM), a random access memory (RAM), magnetic disk, or an optical disk.

The foregoing is only preferred embodiments of the present invention, not intended to limit the invention. Any modifications, equivalent replacements, improvements and the like made within the spirit and principles of the present invention, should all be included in the present invention within the scope of protection.

What is claimed is:

1. A vehicle control method, executed by a computer or processor, comprising:
    during travel of an unmanned vehicle, acquiring current external environment information and map information in real time;
    determining, by a decision making model, vehicle state information corresponding to the external environment information and map information acquired each time, wherein the decision-making model is obtained by pre-training and reflects correspondence relationship between the external environment information, map information and vehicle state information; and
    controlling a travel state of the unmanned vehicle according to the determined vehicle state information;
    wherein the external environment information comprises information of surrounding vehicles and information of surrounding pedestrians;
    wherein the map information is acquired based on a high-precision map; and
    wherein the vehicle state information comprises at least one of the following: vehicle speed, acceleration, steering wheel angle, angular speed of the steering wheel, a state of a steering indicator light, a state of the high-beam light, and a state of a dipped headlight.

2. The vehicle control method according to claim 1, wherein,
    the determining the vehicle state information corresponding to the external environment information and map information acquired each time comprises:
    integrating the external environment information and map information acquired each time as input of the decision-making model, and obtaining the vehicle state information output by the decision-making model.

3. The vehicle control method according to claim 1, wherein,
    a type of the decision-making model comprises: Support Vector Machine (SVM) model or neural network model.

4. A vehicle control apparatus, wherein the vehicle control apparatus comprises:
    at least one processor; and
    a memory storing instructions, which when executed by the at least one processor, cause the at least one processor to perform operations, the operations comprising:
    during travel of an unmanned vehicle, acquiring current external environment information and map information in real time;
    determining, by a decision making model, vehicle state information corresponding to the external environment information and map information acquired each time, wherein the decision-making model is obtained by pre-training and reflects correspondence relationship between the external environment information, map information and vehicle state information; and
    controlling a travel state of the unmanned vehicle according to the determined vehicle state information;
    wherein the external environment information comprises information of surrounding vehicles and information of surrounding pedestrians;
    wherein the map information is acquired based on a high-precision map; and
    wherein the vehicle state information comprises at least one of the following: vehicle speed, acceleration, steering wheel angle, angular speed of the steering wheel, a state of a steering indicator light, a state of the high-beam light, and a state of a dipped headlight.

5. The apparatus according to claim 4, wherein,
the determining the vehicle state information corresponding to the external environment information and map information acquired each time comprises:
integrating the external environment information and map information acquired each time as input of the decision-making model, and obtaining the vehicle state information output by the decision-making model.

6. The apparatus according to claim 4, wherein,
a type of the decision-making model comprises: Support Vector Machine (SVM) model or neural network model.

7. A non-transitory computer storage medium, wherein the computer storage medium is coded with a computer program, and when the program is executed by one or more computers, the one or more computers perform the following operations:
during travel of an unmanned vehicle, acquiring current external environment information and map information in real time;
determining, by a decision-making model, vehicle state information corresponding to the external environment information and map information acquired each time, wherein the decision-making model is obtained by pre-training and reflects correspondence relationship between the external environment information, map information and vehicle state information; and
controlling a travel state of the unmanned vehicle according to the determined vehicle state information;
wherein the external environment information comprises information of surrounding vehicles and information of surrounding pedestrians;
wherein the map information is acquired based on a high-precision map; and
wherein the vehicle state information comprises at least one of the following: vehicle speed, acceleration, steering wheel angle, angular speed of the steering wheel, a state of a steering indicator light, a state of the high-beam light, and a state of a dipped headlight.

* * * * *